United States Patent [19]

Wilson

[11] 3,721,841

[45] March 20, 1973

[54] CONTACT FOR PIEZOELECTRIC CRYSTALS

[75] Inventor: Richard W. Wilson, Phoenix, Ariz.

[73] Assignee: Motorola, Inc., Franklin Park, Ill.

[22] Filed: June 16, 1971

[21] Appl. No.: 153,678

[52] U.S. Cl. ....................310/9.4, 29/579, 29/589, 29/630 G, 29/25.35, 310/9.8

[51] Int. Cl. ....................H01v 7/00

[58] Field of Search....................310/9.7, 9.8, 9.4, 9.1; 29/578, 579, 589, 590, 591, 620, 621, 628, 629, 630 G, 25.35

[56] References Cited

UNITED STATES PATENTS

| | | | |
|---|---|---|---|
| 3,221,189 | 11/1965 | Brandt et al. | 310/9.4 X |
| 2,426,650 | 9/1947 | Sivian | 310/9.7 X |
| 3,377,697 | 4/1968 | Hobbs | 29/621 |
| 3,585,713 | 6/1971 | Kaneda et al. | 29/578 |
| 3,495,324 | 2/1970 | Guthrie et al. | 29/578 |
| 2,695,852 | 11/1954 | Sparks | 29/579 X |
| 2,095,376 | 10/1937 | Bechmann | 310/9.7 |
| 2,410,825 | 11/1946 | Lane | 310/9.7 X |

*Primary Examiner*—J. V. Truhe
*Assistant Examiner*—B. A. Reynolds
*Attorney*—Mueller & Aichele

[57] ABSTRACT

There is disclosed a specialized composite contact for use with piezoelectric crystal frequency standards in which the contact area is minimized at the nodal points of the crystal so as to decrease damping of the crystal by the contacts and therefore increase its Q. The contacts are compatible with reflow soldering techniques thereby eliminating the compressive stress placed upon crystals by thermal compression bonding. Reflow solder is confined to the area of the contact by use of a patterned aluminum electrodes contacting the crystal. On the top of the aluminum electrodes are the composite contacts which are layered, with chromium being the layer next adjacent the aluminum electrode followed by copper and then gold. These contact layers are deposited through a mask whose openings are positioned over the nodal points of the crystal and whose aperture sizes are limited such that contacts formed through this mask approach "point contact" characteristics. The reflow solder adheres only to the gold-copper outer portion of the contact and not to the aluminum metallization.

7 Claims, 5 Drawing Figures

INVENTOR.
Richard W. Wilson
BY
Mueller & Aichele
ATTY'S

INVENTOR.
Richard W. Wilson
BY
Mueller & Aichele
ATTY'S

CONTACT FOR PIEZOELECTRIC CRYSTALS

BACKGROUND OF THE INVENTION

This invention relates to electrical contacts and supporting structures for piezoelectrical crystals and more particularly to a contact which improves the Q of the crystal by contacting the crystal over a minimized area at the nodal points of the crystal or points on the cut crystal which do not move during crystal oscillation.

Although the invention to be described hereinafter finds its greatest use in bar type NT cut as opposed to circular AT cut crystals. The subject contact may be used to advantage in the contacting and support of any piezoelectric crystal with nodal points or areas of inactivity because of its strength and anti-damping qualities. It will be appreciated that the AT cut crystals are primarily useful in the upper frequency ranges while bar type crystals oscillate in the lower frequencies which can be as low as 1000 Hz. Bar type crystals, in one configuration, vibrate in a flexure mode, flexing around two nodal axes within the body of the crystal. In this invention it is possible to support the bar type crystal by contacting it at the points these axes intersect the surface of the crystal without seriously damping crystal oscillation. The crystal can thus be mounted in a shock resistant two or four point suspension without degrading the crystal operation.

It will be appreciated that in the prior art contact system the power consumption of the crystal was high because a high power driving signal was necessary in order to replace the energy taken out of the crystal by the large support contacts. Power consumption of the crystal is a critical factor when, for instance, the crystal is utilized in electronic timepieces such as a wrist watch. It will be appreciated for instance that electronic wrist watches carry a self-contained power source which must usually last for over one year. If the crystal utilized by these wrist watches is excessively damped by the contacts thereto, its power consumption will be greater than that tolerable in the wrist watch configuration. It will be appreciated that the bar type crystals are extremely attractive in the wrist watch configuration as a frequency standard because of their low frequencies. These low frequency crystals need fewer countdown circuits to reduce the frequency of the crystal to a one cycle per second output signal. A smaller number of countdown circuits results in less power consumption and more accuracy.

In the past, contact has been made to these bar type crystals by either thermal compression bonding or soldering. In the thermal compression bonding, a compressive stress is added to the crystal which deleteriously affects it causing yields to be very low. Soldering, on the other hand, in which a conductive silver epoxy is used results in the area of the solder joint being extremely large and unconfined, when the silver paste is initially placed on the crystal at the nodal points by a silk screening process or when it is painted on free hand. Heating the solder so as to be able to connect a wire to the nodal point results in spreading of the solder which results in the aforementioned dampening.

In order to make both an anti-damping electrical and mechanical connection to the nodal points of the crystal, an aluminum film is deposited on the two appropriate sides of the crystal bar. The aluminum layer is patterned so as to apply the electric field to the crystal causing it to vibrate through the piezoelectric effect. On top of this aluminum layer is deposited a contact composed of a three layer metal structure. The layer next adjacent the aluminum is chromium followed by a layer of copper which in turn is followed by a layer of gold. These layers are deposited on the aluminum precisely at the nodal points by the use of a metal mask whose apertures are exceedingly small. The contacts thus formed are so small in diameter that they approach a theoretical point contact. Not only are the contacts small but they provide both excellent electrical conductivity and mechanical strength when a wire is soldered to the contact by use of reflow soldering techniques. It will be appreciated that the solder adheres only to the contact and does not adhere to the aluminum layer. Thus, the contact area is limited. The ability to use a reflow soldering technique has various advantages, not the least of which being the simplicity of manufacturing. Another of the advantages is that the wire is mechanically bonded to the contact across the complete extent of the contact. It will be appreciated that in thermal compression bonding, a hollow tip type capillary tube is utilized such that the wires bonded to the crystal are bonded in a circle and not completely across the area subtended by the outer periphery of the circle. This makes the thermal compression bonds to a crystal relatively weak as compared to a solder bond in which the solder contacts the entire surface. The use of an aluminum layer or film prevents the solder from wetting the surface surrounding the contact. A large wetting area which is the result of a silver epoxy type contact produces a low Q crystal mainly because of damping. In addition in the subject invention, no pressure is necessary when utilizing reflow soldering. One of the most important advantages of utilizing the subject contact is that a large number of crystals can be formed from a crystal wafer or slice. This is accomplished by depositing aluminum on both sides of the wafer and patterning the aluminum. Thereafter dots of contact material are deposited at the nodal points of each crystal to be formed. The wafer is then scribed or cut so as to form individual crystals with the contacts already fabricated thereon.

There is further provided a method and apparatus for providing the metal contacts on the surface of the aluminum which involves the use of a metal alignment mask and a crystal locating plate such that the contact dots are precisely positioned at the nodal points of the crystal.

SUMMARY OF THE INVENTION

It is therefore an object of this invention to provide improved contacts for piezoelectric crystals.

It is a further object of this invention to provide an improved method of contacting piezoelectric crystals in which the contact area is minimized to increase the Q of the crystal.

It is a still further object of this invention to provide a piezoelectric crystal contact in which the contacts to the crystal are located on an aluminum layer and are positioned precisely at the points on the crystal at which no movement occurs when the crystal is vibrating, with the contact being a three layer structure of chromium, copper and gold.

It is yet another object of this invention to provide contacts for piezoelectric crystals that have no detrimental metallurgical reactions at the temperatures used in assembly and operation thereof.

It is yet a further object of this invention to provide a piezoelectric crystal with a flexure mode of vibration with contacts at the nodal points of the crystal which contacts are limited in contact area to improve the Q of the crystal while at the same time providing a reflow solder contact zone such that only the contact zone is wetted by the solder.

It is a still further object of this invention to provide an improved shock-resistant support structure for a piezoelectric crystal which both supports and makes electrical contact to the crystal at its nodal points while at the same time improving the Q of the crystal.

Other objects and features of this invention will become more fully apparent upon reading the following description and taken in connection with the accompanying drawings.

BRIEF DESCRIPTION OF THE INVENTION

There is disclosed a specialized composite contact for use with piezoelectric crystals in which the contact area is minimized at the nodal points of the crystal which minimum area decreases damping of the crystal by the contacts and therefore increases its Q. The contacts are compatible with reflow soldering techniques thereby eliminating the compressive stress placed upon crystals by thermal compression bonding. Reflow solder is confined to the area of the contact by use of a patterned aluminum electrode surrounding the crystal. On the top of the aluminum electrode is the composite layered contact with chromium being the layer next adjacent the aluminum followed by layers of copper and gold. These contact layers are deposited through a mask whose opening is positioned over the nodal points of the crystal and whose aperture size is limited such that the contact formed through this mask approaches point contact characteristics. The reflow solder adheres only to the gold and copper outer portion of the contact and not to the aluminum electrode. The contact thus formed does not metallurgically react at the temperatures used in assembly and operation of the crystal.

DETAILED DESCRIPTION OF THE INVENTION

As mentioned hereinbefore, the ability to make a point contact to a crystal is of extreme importance because of the damping problems usually associated with contacting crystals. In addition, the contact must be mechanically stable and shock-resistant as well as electrically conductive in the sense that is is an ohmic contact. These contacts are made at the nodal points of the crystal so as to absorb a minimum amount of energy thereby permitting the crystal to vibrate or oscillate. The exact position of the nodal points and crystal are very accruately calculatable by present mathematical formulas. For example, in a bar type NT cut crystal these nodal points lie on the surface of the crystal. The physical and mechanical characteristics of bar type crystals are fully set forth in Walter Cady's text entitled *Piezoelectricity*, McGraw Hill Book Company, 1946. As mentioned hereinbefore, contacts having minimum cross sectional areas are also useful in AT cut crystals, square cut crystals or indeed in the contacting of any type piezoelectric crystal, the criteria being the small size of the contact, its strength, and its location at a nodal point or an area of no movement or vibration.

Figure 1:
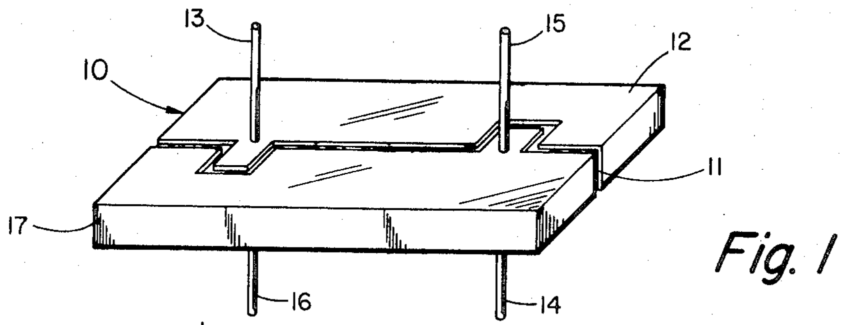
FIG. 1 is a diagrammatic representation of a bar type crystal, showing the patterning of the aluminum layer used therewith, and the contacts thereto.
Figure 2:
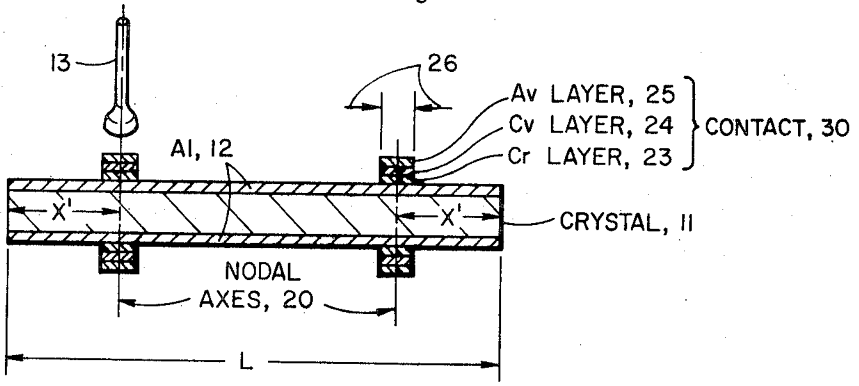
FIG. 2 is a cross-sectional representation of the crystal shown in FIG. 1 indicating the nodal axes within the body of the crystal and the manner of contacting the crystal at the intersection of a nodal axis and the surface of the crystal.

A bar type crystal 10 having the subject composite contacts is shown in FIG. 1 composed of a crystal body 11 surrounded by an aluminum electrode 12 shown patterned so as to connect the conducting lead 13 with the conducting lead 14 and the conducting lead 15 with the conducting lead 16, respectively. It will be appreciated that these connections can be made externally to the crystal in that the side wall portions 17 of the aluminum layer can be omitted. Conducting leads 13, 14, 15 and 16 are attached to the top and bottom surfaces of the crystal at nodal points which reside on the surface of the crystal where nodal axes 20 intersect this surface as shown in FIG. 2. As can be seen from FIG. 3, the flexure mode of vibration of the crystal is shown by the dotted line 21 which shows the flexure of the crystal about the nodal axes 20 both upwardly and downwardly in this mode of vibration. Referring back to FIG. 2, the contact dots or points are formed in a three layer structure comprising layer 23 of chromium, layer 24 of copper and layer 25 of gold. These contact points have a diameter shown by the arrow 26 which in the preferred embodiment is no more than 0.010 inches. These layers are deposited sequentially by evaporation of the materials indicated through a mask. Other methods of metal deposition such as plating and sputtering are also considered within the scope of this invention. This mask is appropriately positioned such that its apertures are correctly aligned with the nodal axes whose positions are ascertained by the appropriate formula.

For an NT cut crystal the nodal axes are at 0.224 × the length of the crystal, L, in from the ends of the crystal as shown by the arrows $x'$ in FIG. 2. The axes intersect the surface of the crystal along a lengthwise center line.

In one experimental configuration, the contacts referred to herein by the reference character 30 are deposited by an upward evaporation of contact metallization. The average layer evaporated has thicknesses in the range of 1.0 to 2.0 microns and is deposited in a vacuum type deposition chamber in the following manner.

First the crystal is cut and lapped to the exact size. After lapping the crystal is cleaned and etched to remove lapping work damage. The cleaned crystal is then placed in a vacuum deposition chamber and a layer of aluminum is then deposed on the crystal by heating the crystal to approximately 200°C and then evaporating aluminum from a tungsten filament. Only one side of the crystal is metallized with aluminum at a time. After evaporation a photoresist is placed on top of the aluminum layer. A dry tape roll on resist is preferred with the crystal being supported in a metal locating plate. Thereafter the photoresist is exposed and the patterned developed by conventional techniques. The aluminum is then etched with appropriate etchants to form the patterned aluminum electrodes shown in one embodiment in FIG. 1. The photoresist is then removed and the metallized crystal is placed in a chromium-copper-gold crystal holding and dot locating fixture such as that shown in connection with FIG. 5. Thereafter the layers of chromium, copper and gold are evaporated as follows: 1000 A of chromium by electron gun techniques; 10,000 A of copper from a tungsten boat; and 2000 A of gold from a tungsten boat. Thereafter the crystal is removed from the fixture and wire supports are attached by reflow soldering.

In the reflow solder process typically these wires are made of berlyium-copper having a diameter of 0.005 inches and are timed with solder which is 95 percent tin and about 5 percent silver. This is a standard solder and which melts at a fairly high temperature as compared to the ordinary 60–40 lead-tin solder. The wire may be nail headed as shown in FIG. 2, at 13, so as to correspond in cross-sectional area to the cross-sectional area on the top of the contact. The wire is placed adjacent to the contact and heated to a temperature of 350°C from whence solder bond is made between the wire 13 and the contact 30. It will be appreciated that any portion of the solder splashing onto the aluminum will not adhere thereto and can be easily removed. The frequency of the crystal is trimmed after contact wires have been applied in a conventional manner. It will be appreciated that the use of a high temperature solder such as that described permits the use of a lower temperature solder when the other ends of the conducting leads are soldered to portions of an electronic circuit. Thus the solder joint between the conducting leads and the contact 30 is not destroyed during circuit connection.

Figure 3:
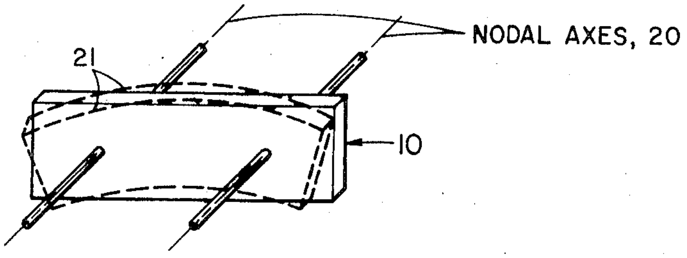
FIG. 3 is a diagram showing the flexure of the crystal shown in FIG. 2 about the nodal axes, which flexure is in a plane parallel to the planes of the larger surfaces of the crystal and in a direction transverse to a line between the points at which the nodal axes intersect the first-mentioned plane.
Figure 4:
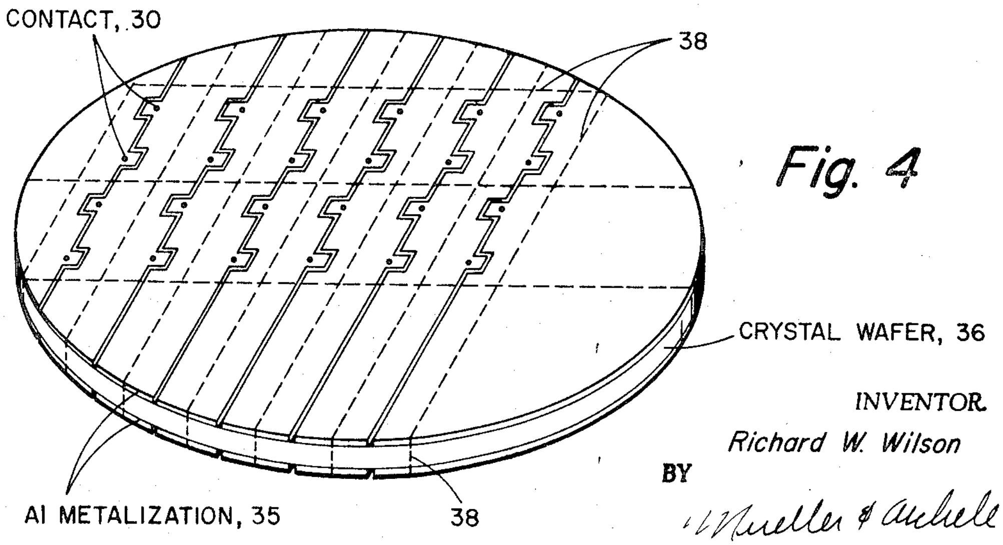
FIG. 4 is a diagrammatic representation of the manufacture of a plurality of individual crystals from a single crystal wafer which has been provided with aluminum metallization and contact dots and which is subsequently cut apart to provide for the individual crystals.

As can be seen in FIG. 3, the subject method of providing contacts permits automating the fabrication of individual crystals. As can be seen from FIG. 4, a crystal wafer, which is in general on the order of .015 inches thick is provided with metallization which is patterned so as to give configurations shown. This aluminum metallization is shown by the layers 35 on top and on bottom of the crystal wafer 36. The patterning is identical to that shown in FIG. 1 and described above such that the longitudinal center line of each individual crystal is provided with a tab 37 of a different aluminum layer. Contacts 30 are then provided by positioning an appropriately apertured metal mask over top of the wafer 36 and by evaporating the aforementioned metals through the apertures in the mask. In the preferred embodiment approximately one micron of aluminum, 1000 angstroms of chromium, a micron of copper and 2000 angstroms of gold are used in forming the composite contact. After the contacts have been appropriately positioned and placed on the corresponding aluminum portions, the wafer is sawed along the various dotted lines 38 thereby separating each individual crystal element from the wafer. The conducting leads are then applied at four positions on each of the crystals and the crystal trimmed in the aforementioned conventional manner to provide a specific frequency. Although the subject device has been described in connection with a four-point suspension system, having contacts on only one side of the crystal is clearly within the scope of this invention.

Figure 5:
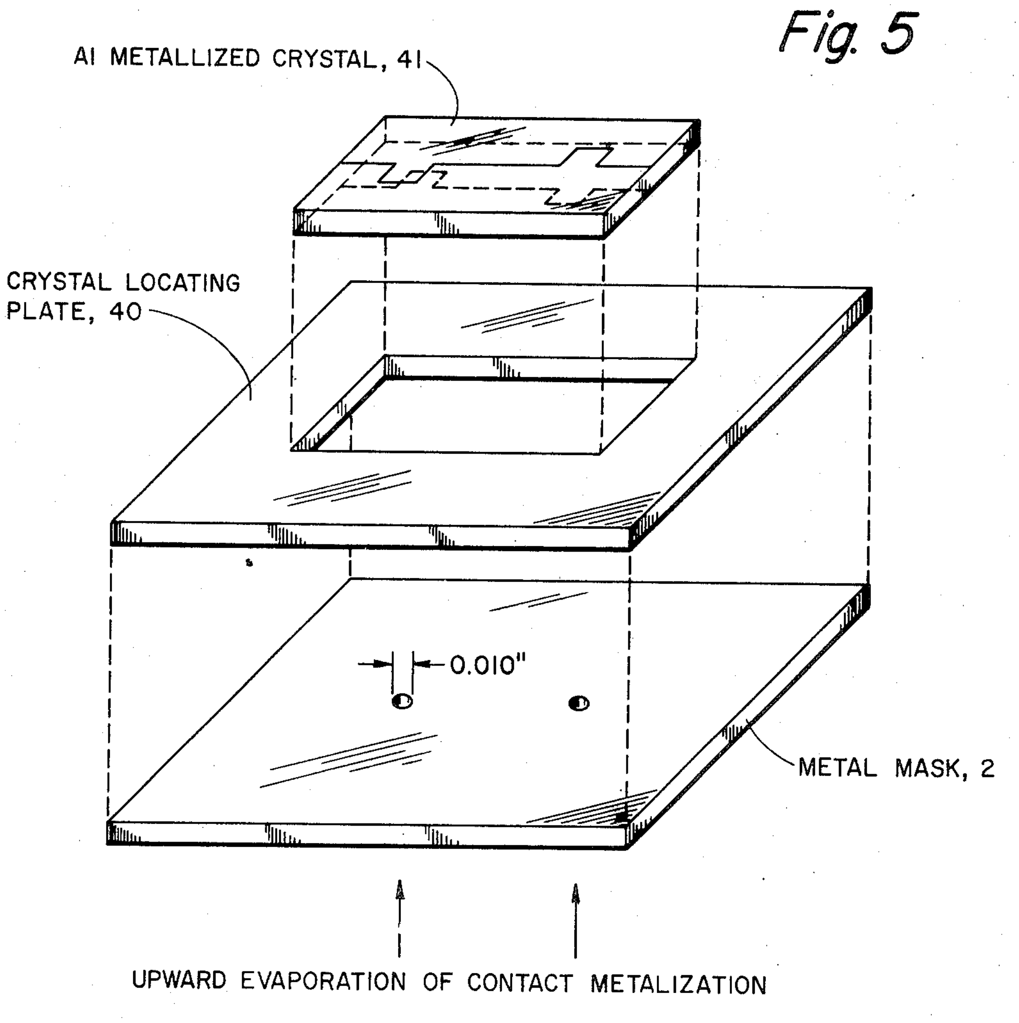
FIG. 5 shows apparatus for properly aligning an individual crystal with a metal mask so as to permit an upward evaporation of contact metallization at the exact locations with respect to the nodal axes of the crystal.

As shown in FIG. 5, the exact alignment of the contacts 30 can be achieved by the use of a simple jig or fixture involving a crystal locating plate 40 into which is positioned a crystal having the appropriate aluminum metallization layer as shown by the aluminum metallized crystal 41. The crystal locating plate containing the aluminum metallized crystal therein is then positioned over metal mask 42 having been provided with apertures appropriately spaced one from the other for the given crystal. The aperture sizes in the metal mask are relatively small as compared to the contacts provided by silk screen of a silver epoxy. In one configuration these apertures are as small as 0.010 inches. The evaporation of the contact metallization is as hereinbefore described.

It will be appreciated that the subject method and the subject contacts provide a very small and clearly delineated contact area for the crystal. The aluminum metallization prevents wetting of the surrounding portions of the crystal when reflow soldering techniques are utilized to bond conducting leads to the contact area. The narrow nature of the contact area itself gives the contact "point contact" characteriztics. The contact, in addition, permits the use of reflow soldering techniques which do not put compressive stress on the crystal which can crack or destroy the crystal during a thermal compression bonding process. In addition, reflow soldering permits a bond to be made across the entire contact, therefore increasing the mechanical stability as well as the electrically conducting properties of the contact. The chromium-copper-gold contact makes excellent ohmic contact to the crystal and is not metallurgically reactive at the temperature employed in fabrication or use. What results is an extremely high Q crystal whose power drain is reduced by an order of magnitude over similar crystals utilizing other contacting techniques. In addition, a process is outlined which permits automated fabrication of the crystals which heretofore have been fashioned one at a time by hand.

What is claimed is:

1. Apparatus for making electrical contact to a piezoelectric crystal comprising:

a patterned aluminum layer covering and surrounding a point on the surface of said crystal which point does not move during crystal oscillation, an electrical contact of limited cross-sectional area on said aluminum layer, said contact lying wholly within said layer and aligned with said point, and said contact being a three-layered structure comprising a layer of chromium in electrical contact with said aluminum layer, a layer of copper in electrical contact with said chromium layer and a layer of gold in electrical contact with said copper layer, said gold layer forming an exposed surface of said contact which is wetted by a solder which solder does not wet the surface of said aluminum layer, thereby forming a contact of limited extent at said point of no movement which minimizes contact damping of said crystal and therefore maximizes the Q thereof.

2. The apparatus as recited in claim 1 wherein said crystal vibrates in a flexure mode by flexing about two nodal axes within the body of said crystal.

3. The apparatus as recited in claim 2 wherein said crystal is a NT cut crystal.

4. The apparatus as recited in claim 1 wherein said chromium layer is 1000 angstroms in thickness, wherein said copper layer is 10,000 angstroms in thickness and wherein said gold layer is 2000 angstroms in thickness.

5. The apparatus as recited in claim 1 wherein said crystal is in the form of a bar having a flexure mode of vibration, said crystal being contacted at a multiplicity of contact points, said contact points being located at the intersection of one of the nodal axes of said crystal and the exposed surface of said aluminum layer.

6. The apparatus as recited in claim 5 wherein said crystal is contacted at two of said contact points, said two points being on one side of said crystal and said crystal being supported from said two points.

7. The apparatus as recited in claim 5 wherein said crystal is contacted at two pairs of said points, the pairs being on opposite sides of said crystal such that points on opposite sides of said crystal lie on a line perpendicular to the flat sides of said bar, said line being a nodal axis of said crystal, whereby a four-point suspension system is formed.

* * * * *